United States Patent
Nielson et al.

(10) Patent No.: US 10,214,410 B2
(45) Date of Patent: Feb. 26, 2019

(54) SELF CALIBRATING FUEL DISPENSING METHOD AND SYSTEM

(71) Applicants: Thomas A. Nielson, Lamoille, NV (US); William Barrett, Provo, UT (US)

(72) Inventors: Thomas A. Nielson, Lamoille, NV (US); William Barrett, Provo, UT (US)

(73) Assignee: Brigham Young University, Provo, UT (US)

(*) Notice: Subject to any disclaimer, the term of this patent is extended or adjusted under 35 U.S.C. 154(b) by 1176 days.

(21) Appl. No.: 13/763,375

(22) Filed: Feb. 8, 2013

(65) Prior Publication Data

US 2013/0199262 A1  Aug. 8, 2013

Related U.S. Application Data

(60) Provisional application No. 61/596,665, filed on Feb. 8, 2012.

(51) Int. Cl.
| | | |
|---|---|---|
| *B67D 7/08* | (2010.01) | |
| *G01F 1/00* | (2006.01) | |
| *G01F 13/00* | (2006.01) | |
| *G01F 25/00* | (2006.01) | |

(52) U.S. Cl.
CPC ............ *B67D 7/085* (2013.01); *G01F 1/007* (2013.01); *G01F 13/006* (2013.01); *G01F 25/0007* (2013.01); *G01F 25/0038* (2013.01)

(58) Field of Classification Search
CPC .... B67D 7/085; G01F 25/0007; G01F 13/006
See application file for complete search history.

(56) References Cited

U.S. PATENT DOCUMENTS

| | | | | |
|---|---|---|---|---|
| 5,404,871 | A * | 4/1995 | Goodman | A61M 15/00 128/200.14 |
| 6,006,775 | A * | 12/1999 | Negley, III | B67D 7/744 137/101.19 |
| 6,925,397 | B2 | 8/2005 | Rogers et al. | |
| 2001/0039978 | A1* | 11/2001 | Hart | B67D 7/0486 141/59 |
| 2003/0209282 | A1* | 11/2003 | Satou | F17C 5/00 141/97 |
| 2004/0117135 | A1* | 6/2004 | Rogers | B67D 7/08 702/55 |
| 2012/0234074 | A1 | 9/2012 | Hagen | |

* cited by examiner

*Primary Examiner* — Stephanie E Bloss
*Assistant Examiner* — Lisa E Peters
(74) *Attorney, Agent, or Firm* — Kunzler, PC

(57) ABSTRACT

Fluid level measurements for the shared tank and outflow information provided by calibrated flow meters corresponding to dispensing stations connected to the shared tank may be used to derive a filled volume model for the tank as a function of fluid level. Subsequently, a filled volume change for a shared tank over a selected time interval may be determined from pre-change and post-change fluid level measurements. The change in filled volume may be compared with the total fluid flow over the selected time interval as indicated by the flow meters of active dispensing stations. If the filled volume change for the tank is substantially different than the total fluid flow indicated by the flow meters, the flow meters may be collectively adjusted to provide a more accurate indication of the filled volume change in the shared tank.

20 Claims, 8 Drawing Sheets

SELF CALIBRATING FUEL DISPENSING METHOD AND SYSTEM

RELATED APPLICATIONS

This application claims priority to U.S. Provisional Application 61/596,665 entitled "CONTINUOUS SELF-CALIBRATING PUMP SYSTEM" and filed on 8 Feb. 2012 for Thomas A. Nielson and William Barrett. The foregoing application is incorporated herein by reference in its entirety.

BACKGROUND OF THE INVENTION

Field of the Invention

The invention relates to fuel dispensing and metering methods, systems and devices.

Description of the Related Art

Currently available fuel dispensing and metering systems require regular testing, calibration and certification in order to maintain accuracies within legally specified ranges. Despite such regular maintenance, a calibrated dispensing station may drift over time. Therefore, in order to avoid fines for providing too little fuel per metered volume, operators typically elect to dispense more fuel than is legally required. As a result, operators lose much of their potential profits to maintaining their fuel dispensing systems and to dispensing excess fuel.

SUMMARY OF THE INVENTION

The present invention has been developed in response to the present state of the art, and in particular, in response to the problems and needs in the art that have not yet been fully solved by currently available fuel dispensing methods and systems. Accordingly, the present invention has been developed to provide systems and methods for self-calibrated dispensing of fuel that overcome many of the shortcomings in the art.

As detailed below, a method for accurately determining fluid volume changes within a shared tank may include logging outflow information for a shared tank via calibrated flow meters corresponding to dispensing stations connected to the shared tank, measuring a fluid level of the tank at multiple points in time during the logging process to provide fluid level information, and deriving a filled volume model for the tank as a function of fluid level from the outflow information and the fluid level information. The method may also include logging deposits of fluid into the shared tank to provide inflow information and using the inflow information when deriving the filled volume model for the tank.

In addition to the above method, a method for calibrating flow meters for fuel dispensing stations that are connected to a shared tank is disclosed that, in certain embodiments, leverages the generated filled volume model for the tank. As detailed below, the method may include determining a filled volume change for a shared tank over a selected time interval, calculating a total fluid flow over the selected time interval as indicated by one or more flow meters corresponding to dispensing stations that were active during the selected time interval, and adjusting the flow meters for each of the active dispensing stations if the filled volume change for the tank is substantially different than the total fluid flow indicated by the flow meters.

Apparatii and systems that execute the above methods are also disclosed herein.

The embodiments described herein provide a variety of advantages. It should be noted that references to features, advantages, or similar language within this specification does not imply that all of the features and advantages that may be realized with the present invention should be, or are in, any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The aforementioned features and advantages of the present invention will become more fully apparent from the following description and appended claims, or may be learned by the practice of the invention as set forth hereinafter.

BRIEF DESCRIPTION OF THE DRAWINGS

To enable the advantages of the invention to be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Figure 1:
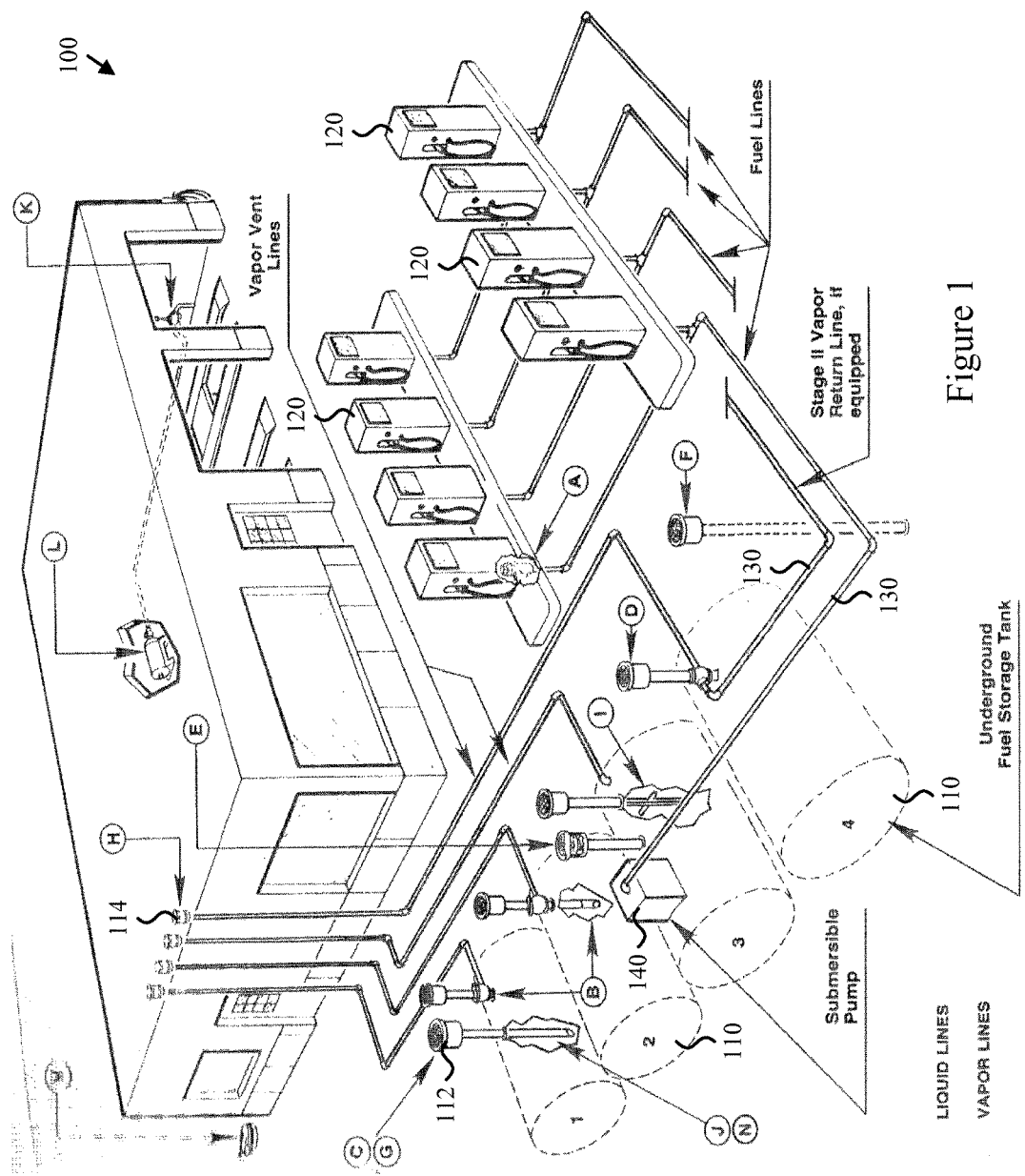
FIG. 1 is a perspective view illustration of a typical fuel dispensing system in which various embodiments described herein may be deployed.

FIG. 1 is a perspective view illustration of a typical fuel dispensing system 100 in which various embodiments described herein may be deployed. As depicted, the fuel dispensing system 100 includes one or more tanks 110 with inlet ports 112 and venting ports 114 that are connected to dispensing stations 120 via fuel lines 130. Fuel may be pumped into the fuel lines via one or more pumps 140. Fuel received by each of the dispensing stations 120 may be dispensed into vehicle tanks (not shown) by users (not shown) and metered with a flow meter (not shown) that facilitates accurately charging the users for the dispensed fuel.

Regular testing, calibration and certification of the flow meters may be required in order to maintain accuracies within legally specified ranges. In order to avoid potential fines for providing too little fuel per metered volume, operators typically elect to dispense more fuel than is legally required. As a result, operators lose much of their potential profits. The methods and systems presented herein address these issues without significant changes to the infrastructure of the fuel dispensing system 100.

Figure 2:
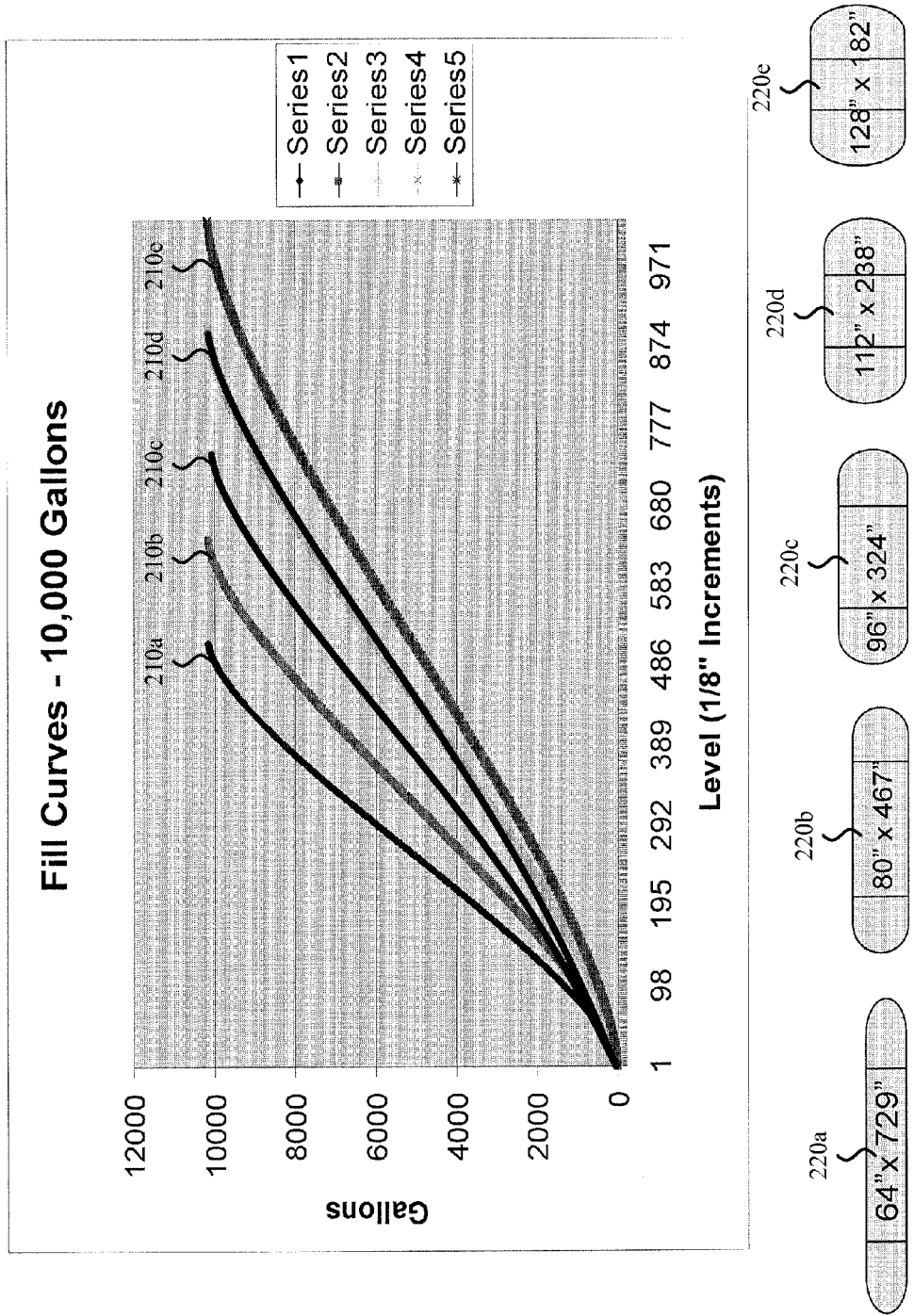
FIG. 2 is graph depicting various fill curves corresponding to fuel tanks of various dimensions.

FIG. 2 is graph 200 depicting various fill curves 210 corresponding to fuel tanks 220 of various dimensions. The fill curves 210 indicate the filled volume of a tank as a function of the fluid level in the tank. Manufacturers of fuel tanks may provide a typical fill curve 210 and/or corresponding data for each tank model that they manufacture. However, installation and usage of a tank may alter the fill curve characteristics and thereby reduce the ability of an operator to know exactly how much fuel is in a tank and/or how much fuel has been deposited into, or dispensed from, a tank.

Figure 3:
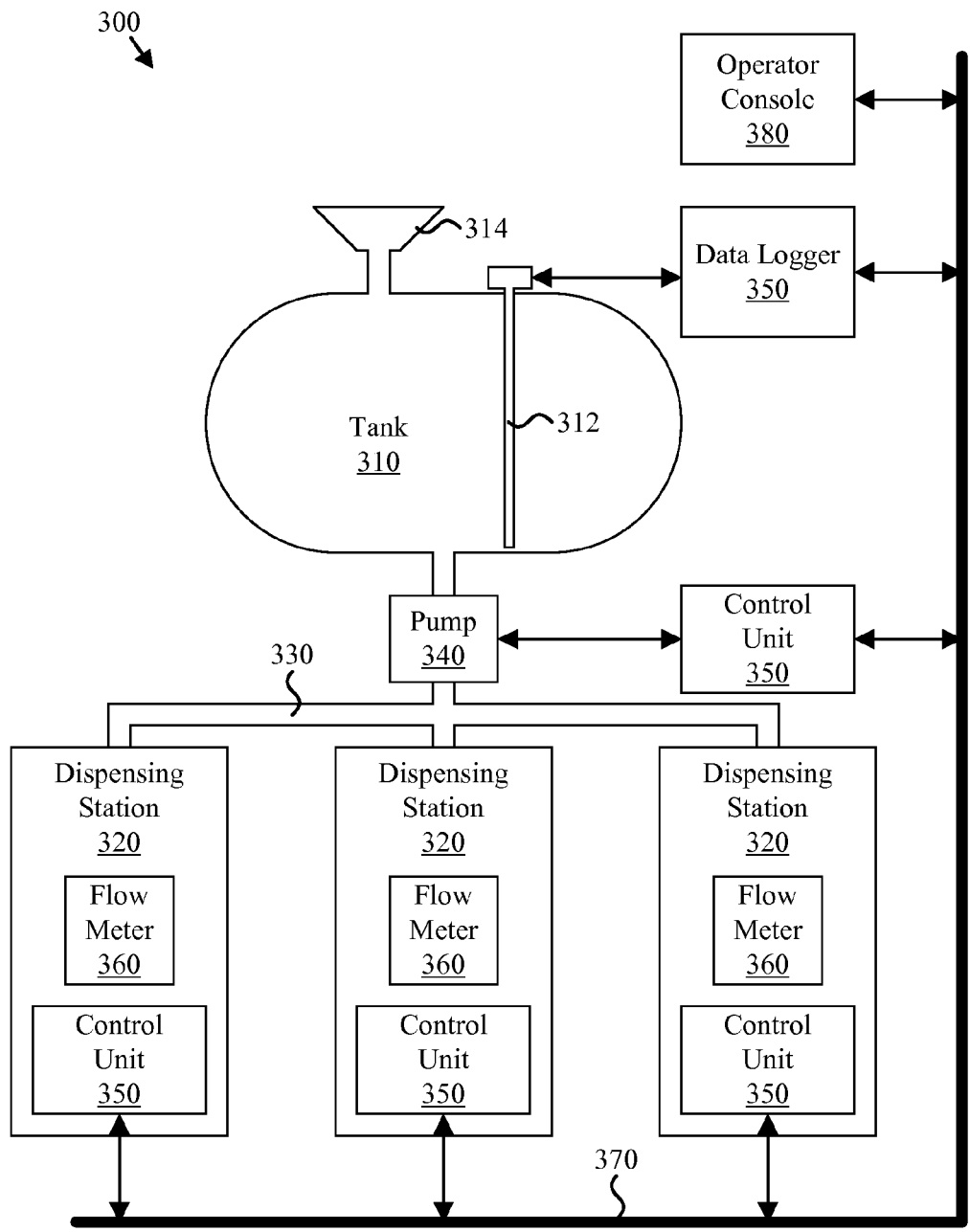
FIG. 3 is schematic block diagram of a fuel dispensing system in accordance with various embodiments described herein.

FIG. 3 is schematic block diagram of a fuel dispensing system in accordance with various embodiments described herein. As depicted, the fuel dispensing system 300 includes one or more tanks 310 with a level gauge or sensor 312. The tanks 310 are connected to dispensing stations 320 via fuel lines 330. Fuel may be deposited into the tank via an inlet port 314. Fuel may be pumped from the tank 310 into the fuel lines 330 via one or more pumps 340.

The dispensing stations 320 may include a tank selector (not shown) that enables selecting fuel from a particular tank. Fuel received by each of the dispensing stations from the selected tank may be metered with a flow meter 360 that facilitates accurately charging the users for the dispensed fuel. One or more control units and/or data loggers 350 interface to the level gauge(s) 312 and the flow meters 360 to facilitate accounting of the dispensed fuels and as well as automatic calibration of each level gauge 312 and flow meter 360. Each control unit and/or data logger 350 may have computer readable storage (not shown) and a processor (not shown) suitable for storing and executing software programs including the methods disclosed herein.

For example, after initial calibration of the flow meters 360, one or more of the control units and/or data loggers 350 may function individually or cooperatively via a network 370 to automatically generate a filled volume model for the tank or fill curve (not shown) that facilitates accurate detection of changes to the filled volume of the tanks 310. In turn, the ability to accurately detect changes to the filled volume of the tanks 310 may be leveraged to automatically and regularly calibrate the flow meters 360 without individually and manually testing each flow meter. An operator console 380 may be used by an operator to monitor and/or control the activity of the system 300.

Figure 4:
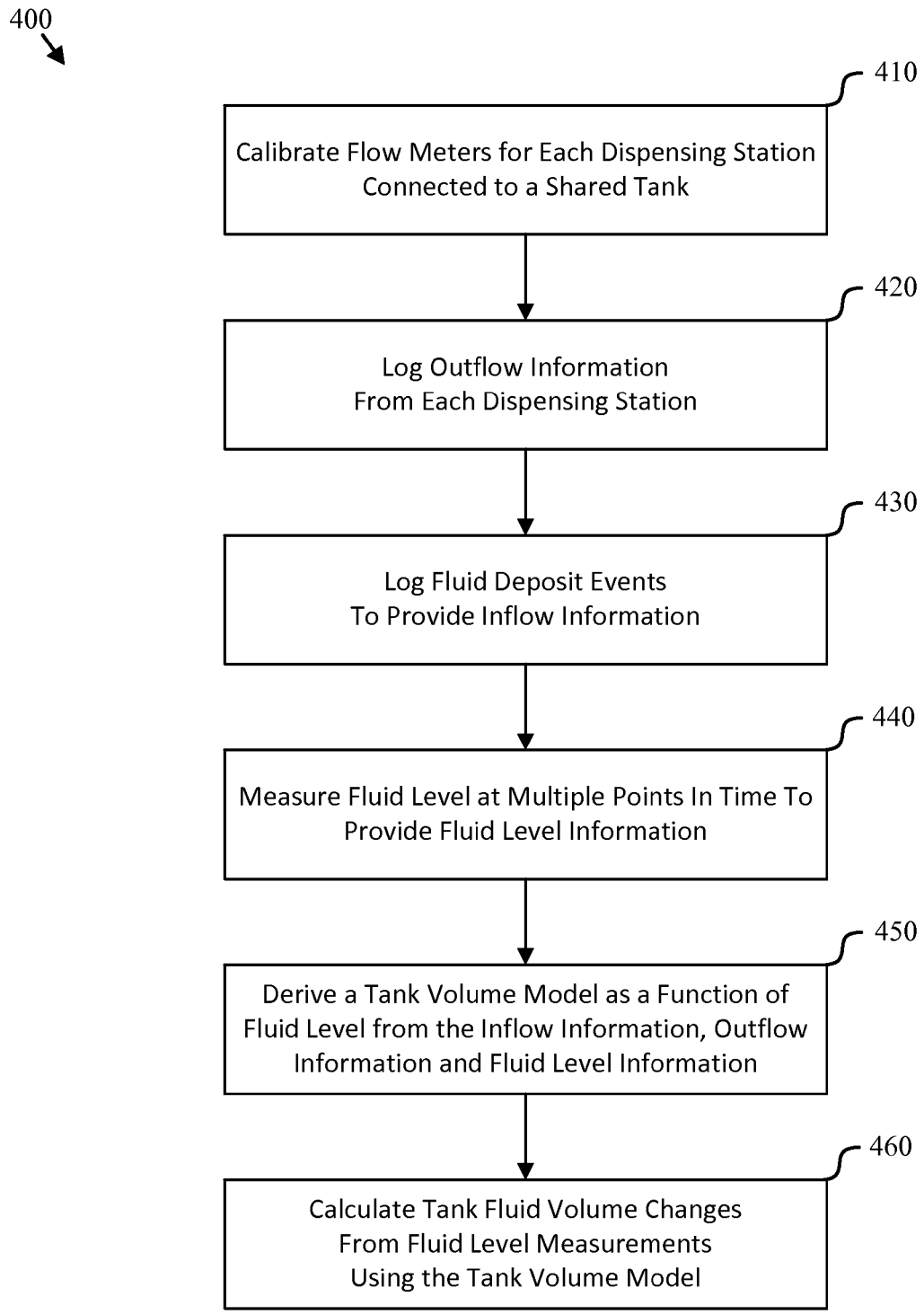
FIG. 4 is flowchart diagram of a tank modeling and dispensing method in accordance with various embodiments described herein.

FIG. 4 is flowchart diagram of a tank modeling and dispensing method 400 in accordance with various embodiments described herein. As depicted, the method 400 includes calibrating 410 one or more flowmeters, logging 420 outflow information, logging 430 fluid deposits, measuring 440 fluid levels at multiple points in time, deriving 450 a filled volume model for the tank and calculating 460 tank fluid volume changes from the filled volume model for the tank.

Calibrating 410 may include calibrating the flowmeters associated with each dispensing station connected to a shared tank. Once in calibration, the flowmeters may be leveraged to generate a filled volume model (or fill curve) for the shared tank.

Logging 420 outflow information may include recording outflow data provided by the flowmeters associated with a tank. Similarly, logging 430 fluid deposits may include collecting delivery or inflow data associated with filling a tank in order to provide inflow information for the shared tank.

Measuring 440 fluid levels at multiple points in time may include interfacing to a fluid level gauge or the like associated with the shared tank and logging fluid level information at specific points in time. For example, fluid level information may be collected at regular intervals or in response to specific events such as commencing or terminating a fuel dispensing session at a dispensing station.

Figure 5:
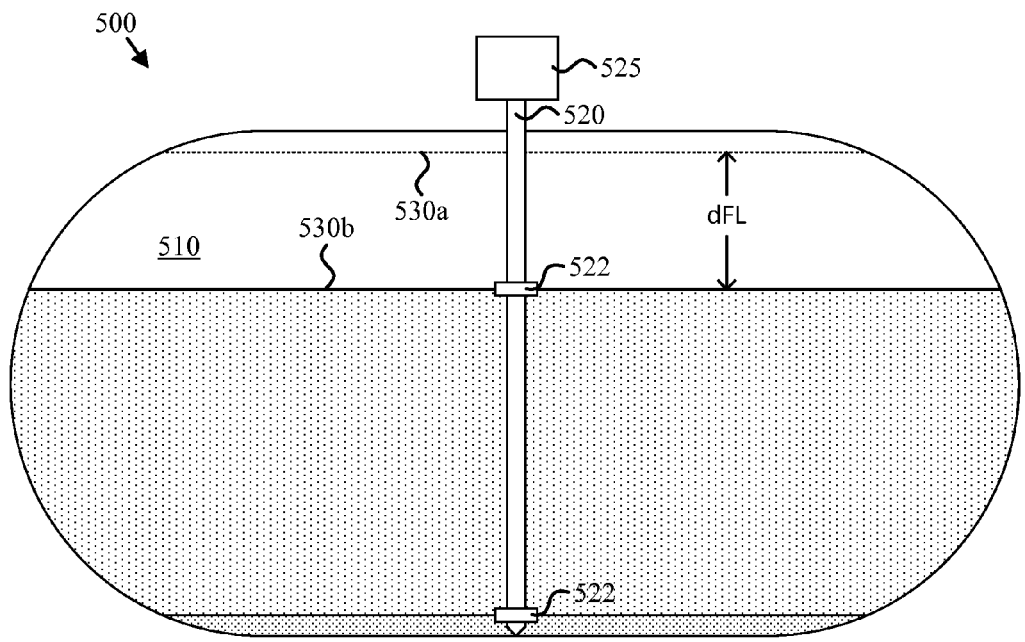
FIG. 5 is cross-sectional illustration of a fuel tank in accordance with various embodiments described herein.
Figure 6:
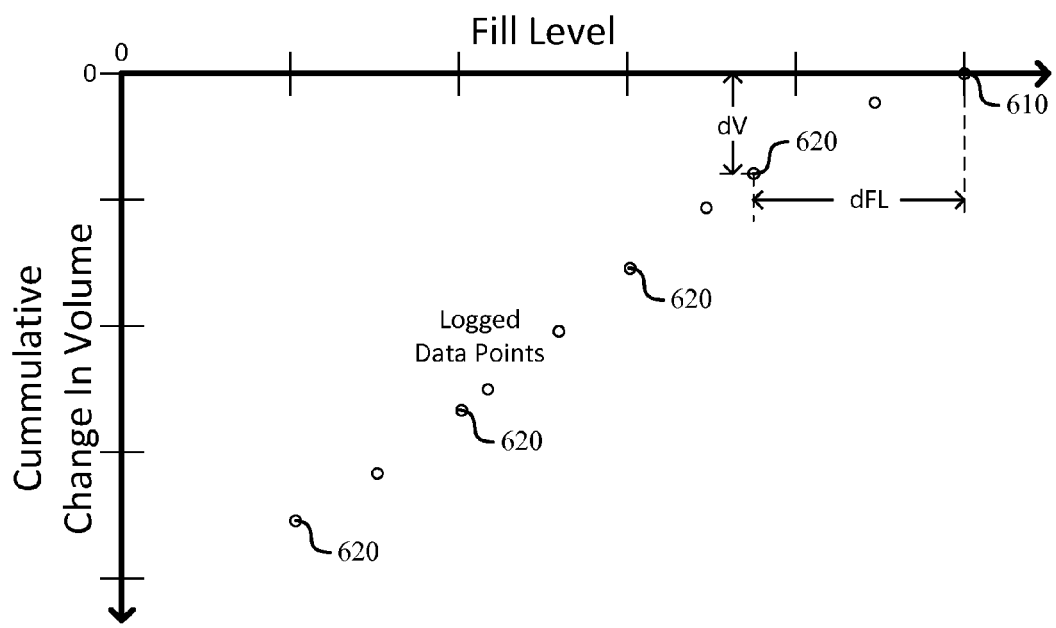
FIGS. 6 and 7 are graphs illustrating data collected in accordance with the method of FIG. 4.
Figure 7:
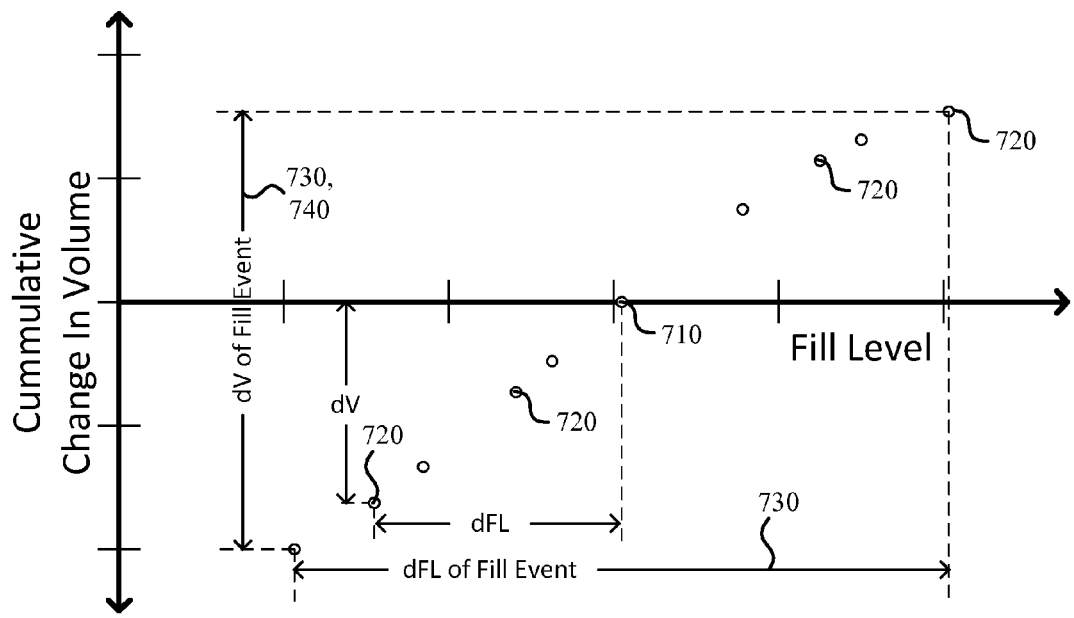

Deriving 450 a filled volume model for the tank may include using the inflow information and outflow information to determine the changes in tank fluid volume between successive fluid level measurements and using repeated fluid volume changes to determine the relative filled volume of the tank as a function of fluid level. FIGS. 5-7 depict additional details on building the filled volume model for the tank.

Once the filled volume model for the tank is built, the depicted method may be advanced by using 460 the filled volume model for the tank to calculate changes in tank fluid volume from fluid level measurements. For example, a pre-change tank fluid volume corresponding to a pre-change fluid level may be subtracted from a post-change tank fluid volume corresponding to a post-change fluid level in order to determine the change in tank fluid volume.

FIG. 5 is cross-sectional illustration of a fuel tank 500 in accordance with various embodiments described herein. The fuel tank 500 may include a cavity 510 that stores a fluid such as a liquid fuel and a level gauge 520 with one or more floats 522 and a data interface 525. The level gauge 520 may be used to detect a change in the tank fluid level 530 from a pre-change level 530a to a post change level 530b.

FIGS. 6 and 7 are graphs illustrating data collected for a fuel tank 500 or the like in accordance with the method of FIG. 4. By making an initial fluid level measurement 610 or 710, a reference point for tracking cumulative changes in tank fluid volume may be established. Subsequently, additional fluid level measurements 620, 720 may be made while cumulative changes in tank fluid volume are tracked by using the outflow information provided by the flowmeters of each dispensing station and inflow information corresponding to depositing fuel into the shared fuel tank.

FIGS. 6 and 7 also illustrate that the reference point for cumulative changes in the tank fluid volume is arbitrary. Namely, the collected data points will reveal the (relative)

relationship between the fill level and the tank fluid volume independent of the initial reference point. FIG. 7 also shows that data may be collected before and after a tank filling event 730 as long as the fuel volume inflow 740 is logged and utilized in tracking the cumulative changes in tank fluid volume. In one embodiment, an operator indicates to the system 300 via the console 380 that a tank filling session is about to occur and the system 300 defers collecting data points and computing filled volume changes until the tank filling session is completed.

Figure 8:
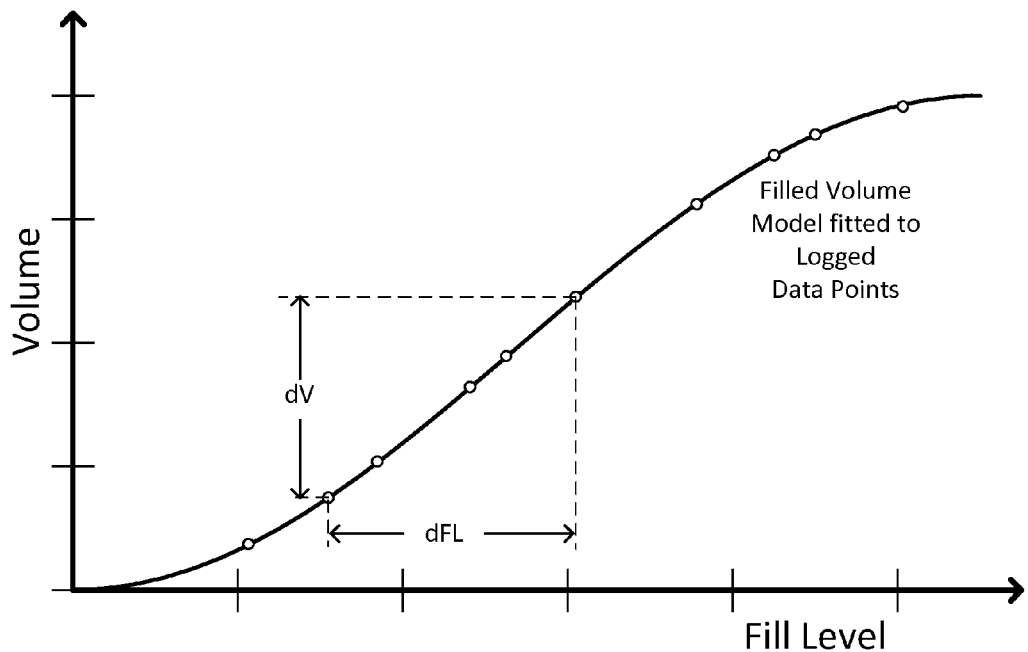
FIG. 8 is a graph illustrating a fill curve generated in accordance with the method of FIG. 4.

Once a sufficient number of data points have been collected a filled volume model for the tank or fill curve may be fitted to the data as shown in FIG. 8. The filled volume model for the tank may be a polynomial equation or the like that is fitted to the collected data using conventional data fitting techniques. In certain embodiments, the model may comprise one or more parameters that correspond to, or correlate to, a geometric shape such as the radius and length of a cylinder. For example, in one embodiment, the Diameter and Length of a cylindrical tank are estimated with the equations Diameter=12822.491676/Slope and Length=2985978.07302237/(Diameter^1.99999995) where Slope is the slope of the fill curve measured from 0.36*Vmax to 0.64*Vmax and where Vmax is the maximum volume of the cylindrical tank.

In some embodiments, the filled volume model for the tank may include deviations from an idealized fill curve or a manufacture provided fill curve. In one embodiment, an expected fill curve is generated by volume (i.e. mathematical) integration of the expected shape of the tank and deviations from the expected fill curve are stored in the filled volume model for the tank.

Figure 9:
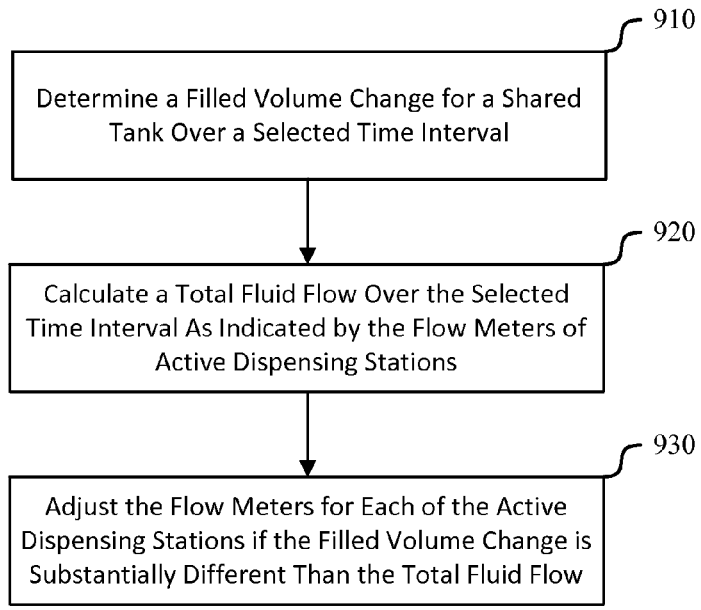
FIG. 9 is flowchart diagram of a self-calibrating dispensing method in accordance with various embodiments described herein.

FIG. 9 is flowchart diagram of a self-calibrating dispensing method 900. As depicted, the method 900 includes determining 910 a filled volume change, calculating 920 a total fluid flow and adjusting 930 one or more flow meters. The method 900 may be executed by one or more processors associated with the fuel dispensing system 300 or the like.

Determining 910 may include determining a filled volume change for a shared tank over a selected time interval. Similarly, calculating 920 a total fluid flow may include summing the fluid flow indicated by the flow meters of dispensing stations that were active over the selected time interval as well as tank inflows associated with depositing fuel into the tank. Adjusting 930 one or more flow meters may include adjusting the flow meters for each of the active dispensing stations if the filled volume change is substantially different than the total fluid flow from the active dispensing stations.

Adjusting the flow meters may include increasing an indicated flow for each of the active dispensing stations if the total fluid flow indicated by the active flow meters is substantially less than the filled volume change and decreasing an indicated flow for each of the active dispensing stations if the total fluid flow indicated by the flow meters is substantially greater than the filled volume change. The amount of adjustment to each flow meter may be weighted by a relative dispensing time or dispensing volume of each dispensing station to the total dispensing time or dispensing volume over a selected interval.

For example, in one embodiment the amount of adjustment to each flow meter is calculated according to the equation: indicatedFlowChange[i]=dampingFactor×dispensingTime[i]×(changeInFilledVolume−totalFluidFlow)/(numberOfActiveStations×elapsedTime) where i is an index for a particular dispensing station, dampingFactor is a value between 0 and 1 that is used to reduce overshoot and increase stability in the executed adjustments and elapsedTime is the duration of the selected interval.

In another embodiment, the amount of adjustment to each flow meter is calculated according to the equation: indicatedFlowChange[i]=dampingFactor×indicatedFlow[i]×(changeInFilledVolume−totalFluidFlow)/(changeInFilledVolume) where i is an index for a particular dispensing station and dampingFactor is a value between 0 and 1 that is used to reduce overshoot and increase stability in the executed adjustments.

Although the error of each individual flow meter is not known, statistical converge toward zero may be achieved by the described methods. Namely, by collectively adjusting the indicated flow of all of the active flow meters proportional to a difference between the total fluid flow and the filled volume change, the variation in combinations of active flow meters during the selected intervals facilitates statistical convergence of the difference between the filled volume change and total indicated flow toward zero.

One of skill in the art will appreciate that a large or continued discrepancy between the change in filled volume and the total indicated flow may indicate a serious problem such as fuel theft, a leak, a flow meter malfunction, damage to a tank or the like. Consequently, an alarm may be triggered and/or limits may be set on the amount of adjustment that is allowed to the flow meters. In certain embodiments, pending adjustments to flow meters are submitted to a station operator, technician or administrator for monitoring and/or approval.

Figure 10:
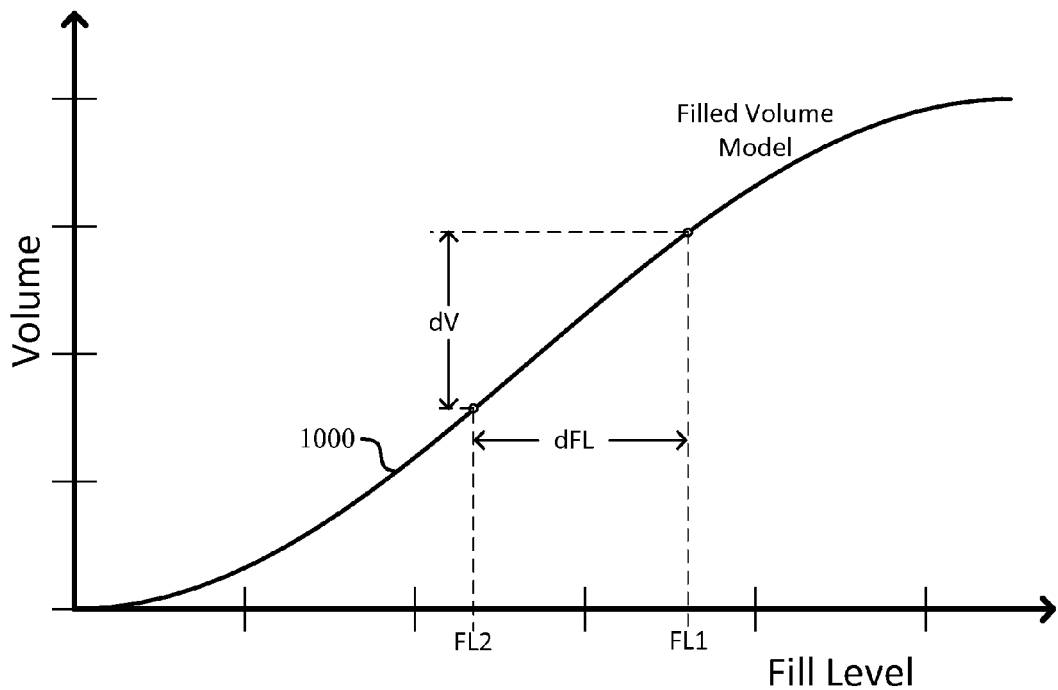
FIG. 10 is a graph illustrating leveraging a fill curve in accordance with the method of FIG. 9.

FIG. 10 is a graph illustrating leveraging a fill curve 1000 in accordance with embodiments depicted herein. For example, the fill curve 1000 or a similar fill volume model may be generated by the method depicted in FIG. 4 and utilized in the methods depicted in FIGS. 9 and 11.

As depicted, a pre-change level (FL1) may be measured in a fuel tank previous to a selected interval. Subsequently, after the selected interval, a post change level (FL2) may be measured in the fuel tank. By referencing the fill curve 1000, or similar filled volume model associated with the fuel tank, a change in filled volume may be calculated for the tank. The calculated change in filled volume may be used to calibrate the flow meters of dispensing stations that were active over the selected interval.

One of skill in the art will appreciate that increased resolution and accuracy for the fuel gauge used to measure the fill levels in a tank will result in increased accuracy for the flow meter calibration process.

Figure 11:
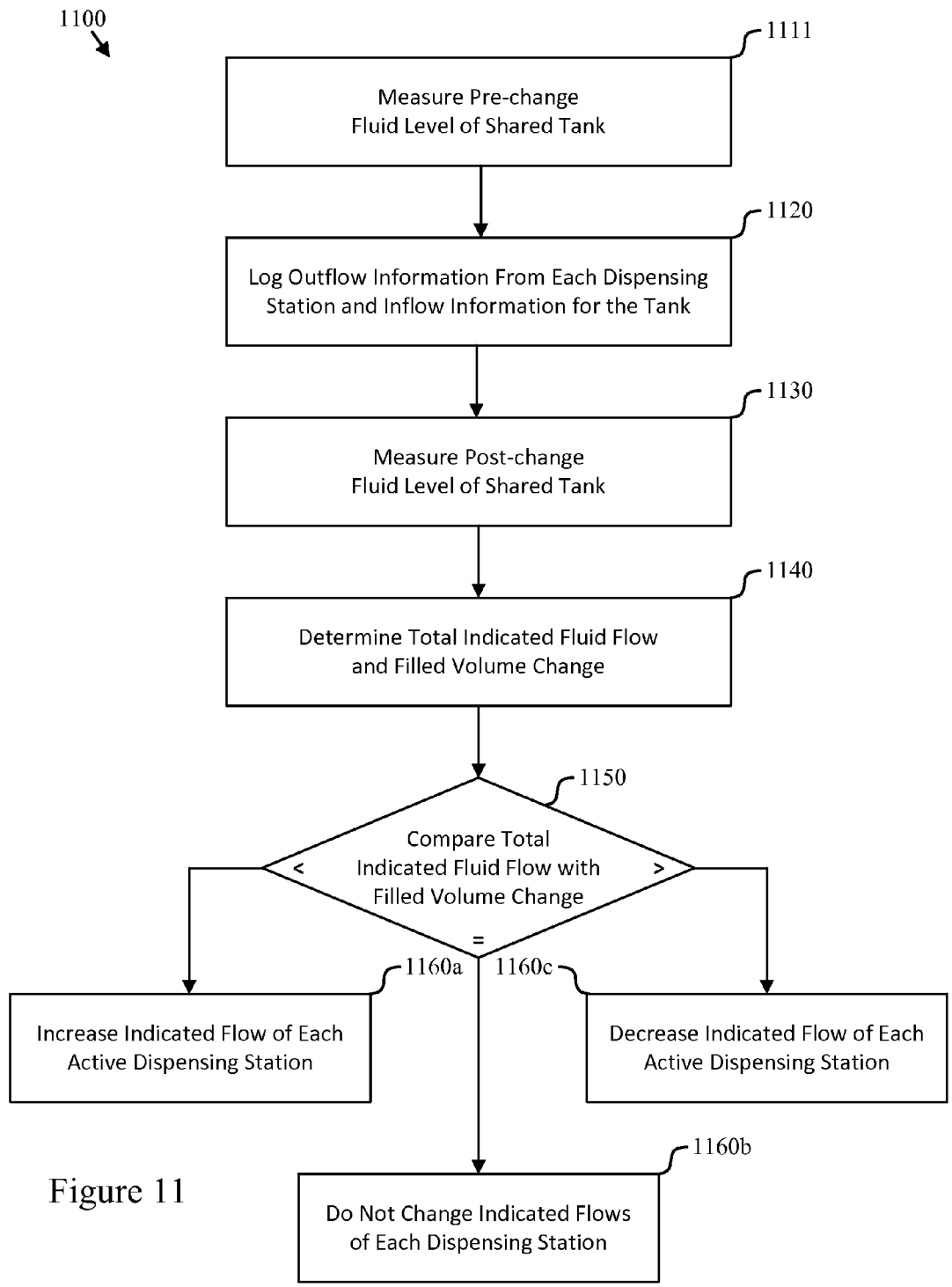
FIG. 11 is flowchart diagram of a specific self-calibrating dispensing method in accordance with various embodiments described herein.

FIG. 11 is flowchart diagram of a specific self-calibrating dispensing method 1100 in accordance with various embodiments described herein. As depicted, the method includes measuring 1110 a pre-change fluid level, logging 1120 outflow and inflow information, measuring 1130 a post-change fluid level, determining 1140 a total fluid flow and a filled volume change, comparing 1150 the total indicated fluid flow with the filled volume change, and adjusting 1160 the indicated flow. The dispensing method 1100 is a specific version of the dispensing method 900.

Measuring 1110 and measuring 1130 may be conducted by reading a level gauge associated with a shared tank before and after a selected interval. Logging 1120 outflow and inflow information may include logging metering data provide by the flow meters of dispensing stations. Determining 1140 a total indicated fluid flow and a filled volume change may include summing the outflow and inflow information over the selected interval and referencing a tank fill curve to compute the filled volume change.

In one embodiment, comparing 1150 the total indicated fluid flow with the filled volume change is accomplished by a subtraction operation. Adjusting 1160 the indicated flow may include increasing 1160*a* the indicated flow of each active dispensing station if the total indicated flow is less than the filled volume change. Adjusting 1160 the indicated flow may also include increasing 1160*c* the indicated flow of each active dispensing station if the total indicated flow is greater than the filled volume change or not adjusting 1160*b* the indicated flows if the total indicated flow is substantially equal to the filled volume change.

The present invention facilitates accurate and continued calibration of a fuel dispensing system without requiring individual flow meter testing. The present invention may be embodied in other specific forms without departing from its spirit or essential characteristics. One of skill in the art will recognize that the methods and systems disclosed herein can be applied to multi-tank installations as well as single tank installations. For example, a group of tanks tied together with a manifold may each have a fuel level gauge and reading each fuel level gauge can facilitate modeling of the multi-tank system and the calibration of the dispensing stations coupled to those tanks. Therefore, the described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
   determining a filled volume change for a shared tank over a selected time interval;
   calculating a total fluid flow over the selected time interval as indicated by a plurality of flow meters corresponding to a corresponding plurality of dispensing stations that were active during the selected time interval;
   adjusting a first flow meter of the plurality of flow meters proportional to an estimated dispensing error times a first fluid flow indicated by the first flow meter divided by a total fluid flow indicated by the plurality of flow meters; and
   wherein the estimated dispensing error is equal to a difference between the filled volume change for the shared tank over the selected time interval and the total fluid flow indicated by the plurality of flow meters.

2. The method of claim 1, wherein determining the filled volume change comprises measuring a pre-change level and a post change level with a tank level gauge that corresponds to the shared tank.

3. The method of claim 1, wherein determining the filled volume change comprises referencing a filled volume model for the shared tank as a function of fluid level.

4. The method of claim 3, wherein referencing the filled volume model for the shared tank comprises mapping a pre-change level and a post change level to a pre-change filled volume and a post-change filled volume, respectively.

5. The method of claim 1, wherein adjusting the first flow meter comprises increasing an indicated flow.

6. The method of claim 1, wherein adjusting the first flow meter comprises decreasing an indicated flow.

7. The method of claim 1, wherein the first flow meter is adjusted proportional to the estimated dispensing error times a damping factor.

8. The method of claim 1, wherein a flow meter for an active dispensing station of the plurality of active dispensing stations is adjusted according to a ratio of an active dispensing time for the active dispensing station and an elapsed time for the selected time interval.

9. The method of claim 1, wherein a flow meter for an active dispensing station of the plurality of active dispensing stations is adjusted according to a ratio of a fluid flow indicated by the flow meter and the filled volume change or the total fluid flow.

10. An apparatus comprising at least one processor that executes the method of claim 1.

11. A fuel dispensing system comprising:
    a plurality of dispensing stations;
    a shared tank connected to the plurality of dispensing stations; and
    at least one control unit that executes the method of claim 1.

12. A method comprising:
    logging outflow information for a shared tank over a first selected interval via calibrated flow meters corresponding to dispensing stations connected to the shared tank;
    measuring a fluid level of the shared tank at a plurality of points in time during the logging process to provide fluid level information for the shared tank over the first selected interval;
    deriving a filled volume model for the shared tank as a function of fluid level from the outflow information and the fluid level information;
    determining a filled volume change for the shared tank over a second selected interval using the filled volume model based on a measured change in the fluid level of the shared tank during the second selected interval;
    calculating a total fluid flow over the second selected time interval as indicated by a plurality of flow meters corresponding to a corresponding plurality of dispensing stations that were active during the second selected time interval;
    adjusting a first flow meter of the plurality of flow meters proportional to an estimated dispensing error times a first fluid flow indicated by the first flow meter divided by the total fluid flow over the second selected time interval; and
    wherein the estimated dispensing error is equal to a difference between the filled volume change and the total fluid flow over the second selected time interval.

13. The method of claim 12, further comprising using the filled volume model for the shared tank to calculate changes in fluid volume from pre-change and post-change fluid level measurements.

14. The method of claim 12, further comprising logging deposits of fluid into the shared tank to provide inflow information.

15. The method of claim 14, further comprising using the inflow information to derive the filled volume model for the shared tank.

16. The method of claim 12, further comprising adjusting the flow meters of one or more active dispensing stations using the filled volume model.

17. The method of claim 12, further comprising wherein the filled volume model for the shared tank comprises parameters that correlate to a geometric shape.

18. The method of claim 12, further comprising wherein the filled volume model for the shared tank comprises deviations from a manufacture provided fill curve or an expected fill curve.

19. An apparatus comprising at least one processor that executes the method of claim 12.

20. A fuel dispensing system comprising:
a plurality of dispensing stations;
a shared tank connected to the plurality of dispensing stations; and
at least one processor that executes the method of claim 12.

* * * * *